United States Patent
Ford et al.

(10) Patent No.: US 10,678,248 B2
(45) Date of Patent: Jun. 9, 2020

(54) FAST TRAJECTORY PLANNING VIA MANEUVER PATTERN SELECTION

(71) Applicant: GM Global Technology Operations LLC, Detroit, MI (US)

(72) Inventors: Jordan Ford, Warren, MI (US); Sayyed Rouhollah Jafari Tafti, Troy, MI (US); Syed B. Mehdi, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/897,368

(22) Filed: Feb. 15, 2018

(65) Prior Publication Data
US 2019/0250617 A1 Aug. 15, 2019

(51) Int. Cl.
*G05D 1/02* (2006.01)
*G05D 1/00* (2006.01)

(52) U.S. Cl.
CPC ......... *G05D 1/0212* (2013.01); *G05D 1/0088* (2013.01)

(58) Field of Classification Search
CPC ............... G05D 1/0212; G05D 1/0088
USPC ......................................................... 701/25
See application file for complete search history.

(56) References Cited

U.S. PATENT DOCUMENTS

| | | | |
|---|---|---|---|
| 8,126,642 B2 * | 2/2012 | Trepagnier | G01S 17/023 701/423 |
| 9,632,502 B1 * | 4/2017 | Levinson | G01S 7/4972 |
| 2017/0192437 A1 * | 7/2017 | Bier | G05D 1/0038 |
| 2018/0141568 A1 * | 5/2018 | Singhal | B62D 15/00 |
| 2018/0348002 A1 * | 12/2018 | Aggarwal | G01C 21/3461 |
| 2019/0041228 A1 * | 2/2019 | Singhal | G05D 1/021 |
| 2019/0084578 A1 * | 3/2019 | Alasry | B60W 50/0098 |

* cited by examiner

*Primary Examiner* — Marthe Y Marc-Coleman
(74) *Attorney, Agent, or Firm* — Cantor Colburn LLP

(57) ABSTRACT

Technical solutions are described for maneuvering a vehicle autonomously is described. An example method includes receiving, by a controller, a command to navigate the vehicle, the command based on a global route calculation. The method further includes ranking, by the controller, maneuver patterns from a list of maneuver patterns to generate a ranked list of maneuver patterns. The method further includes selecting a maneuver pattern from the ranked list, and in response to a comfort score assigned to the selected maneuver pattern being above a predetermined threshold, executing the maneuver pattern.

18 Claims, 5 Drawing Sheets

FAST TRAJECTORY PLANNING VIA MANEUVER PATTERN SELECTION

INTRODUCTION

The subject disclosure relates to autonomous/semi-autonomous vehicles and particularly to autonomous trajectory planning.

Trajectory planning is required for autonomous and semi-autonomous highway driving and for advanced driver assistance systems (ADAS) such as collision avoidance. Trajectory planning is typically reactive to changes in host vehicle dynamics and other static and dynamic objects on the road. The goal of the planned trajectory is to maneuver the vehicle in a safe, collision free manner along a provided path within the road boundaries; which is feasible for the host vehicle in view of the vehicle dynamic constraints such as maximum lateral acceleration/jerk. The vehicle dynamics can affect comfort level of the occupants of the host vehicle. Typical path planning techniques are computationally intensive for real-time applications to be reactive in an appropriate time.

Accordingly, it is desirable to facilitate the host vehicle to provide a fast trajectory planning via maneuver pattern selection.

SUMMARY

In one exemplary embodiment a method for maneuvering a vehicle autonomously is described. The method includes receiving, by a controller, a command to navigate the vehicle, the command based on a global route calculation. The method further includes ranking, by the controller, maneuver patterns from a list of maneuver patterns to generate a ranked list of maneuver patterns. The method further includes selecting a maneuver pattern from the ranked list, and in response to a comfort score assigned to the selected maneuver pattern being above a predetermined threshold, executing the maneuver pattern.

In one or more examples, a maneuver pattern describes a set of trajectories. Further, selecting the maneuver pattern includes determining the comfort score of a first trajectory from the maneuver pattern based on attribute values assigned to the trajectory and local parameters. The local parameters include parameters computed for obstacles in a predetermined vicinity surrounding the vehicle. In one or more examples, the selection of the maneuver further includes performing a local optimization within the plurality of trajectories to identify a trajectory that satisfies the predetermined threshold for the comfort score.

In addition to one or more of the features described herein the selected maneuver pattern is the highest ranked untried maneuver pattern from the ranked list. Further yet, the method includes adjusting the predetermined threshold if none of the maneuver patterns from the ranked list meet the predetermined threshold.

In another exemplary embodiment a trajectory planning system includes a memory, and a processor coupled with the memory. The processor determines a trajectory for moving a vehicle autonomously. The determination includes receiving, by a controller, a command to navigate the vehicle, the command based on a global route calculation. The determination further includes ranking, by the controller, maneuver patterns from a list of maneuver patterns to generate a ranked list of maneuver patterns. The determination further includes selecting a maneuver pattern from the ranked list, and in response to a comfort score assigned to the selected maneuver pattern being above a predetermined threshold, executing the maneuver pattern.

In one or more examples, a maneuver pattern includes a set of trajectories. Further, selecting the maneuver pattern includes determining the comfort score of a first trajectory from the maneuver pattern based on attribute values assigned to the trajectory and local parameters. The local parameters include parameters computed for obstacles in a predetermined vicinity surrounding the vehicle. In one or more examples, the selection of the maneuver further includes performing a local optimization within the plurality of trajectories to identify a trajectory that satisfies the predetermined threshold for the comfort score.

In addition to one or more of the features described herein the selected maneuver pattern is the highest untried maneuver pattern from the ranked list. Further yet, the determination includes adjusting the predetermined threshold if none of the maneuver patterns from the ranked list meet the predetermined threshold.

In yet another exemplary embodiment a vehicle controller is described for determining a trajectory for moving a vehicle autonomously. The determination includes receiving, by a controller, a command to navigate the vehicle, the command based on a global route calculation. The determination further includes ranking, by the controller, maneuver patterns from a list of maneuver patterns to generate a ranked list of maneuver patterns. The determination further includes selecting a maneuver pattern from the ranked list, and in response to a comfort score assigned to the selected maneuver pattern being above a predetermined threshold, executing the maneuver pattern.

In one or more examples, a maneuver pattern includes a set of trajectories. Further, selecting the maneuver pattern includes determining the comfort score of a first trajectory from the maneuver pattern based on attribute values assigned to the trajectory and local parameters. The local parameters include parameters computed for obstacles in a predetermined vicinity surrounding the vehicle. In one or more examples, the selection of the maneuver further includes performing a local optimization within the plurality of trajectories to identify a trajectory that satisfies the predetermined threshold for the comfort score.

In addition to one or more of the features described herein the selected maneuver pattern is the highest untried maneuver pattern from the ranked list. Further yet, the determination includes adjusting the predetermined threshold if none of the maneuver patterns from the ranked list meet the predetermined threshold.

The above features and advantages, and other features and advantages of the disclosure are readily apparent from the following detailed description when taken in connection with the accompanying drawings.

Figure 1:
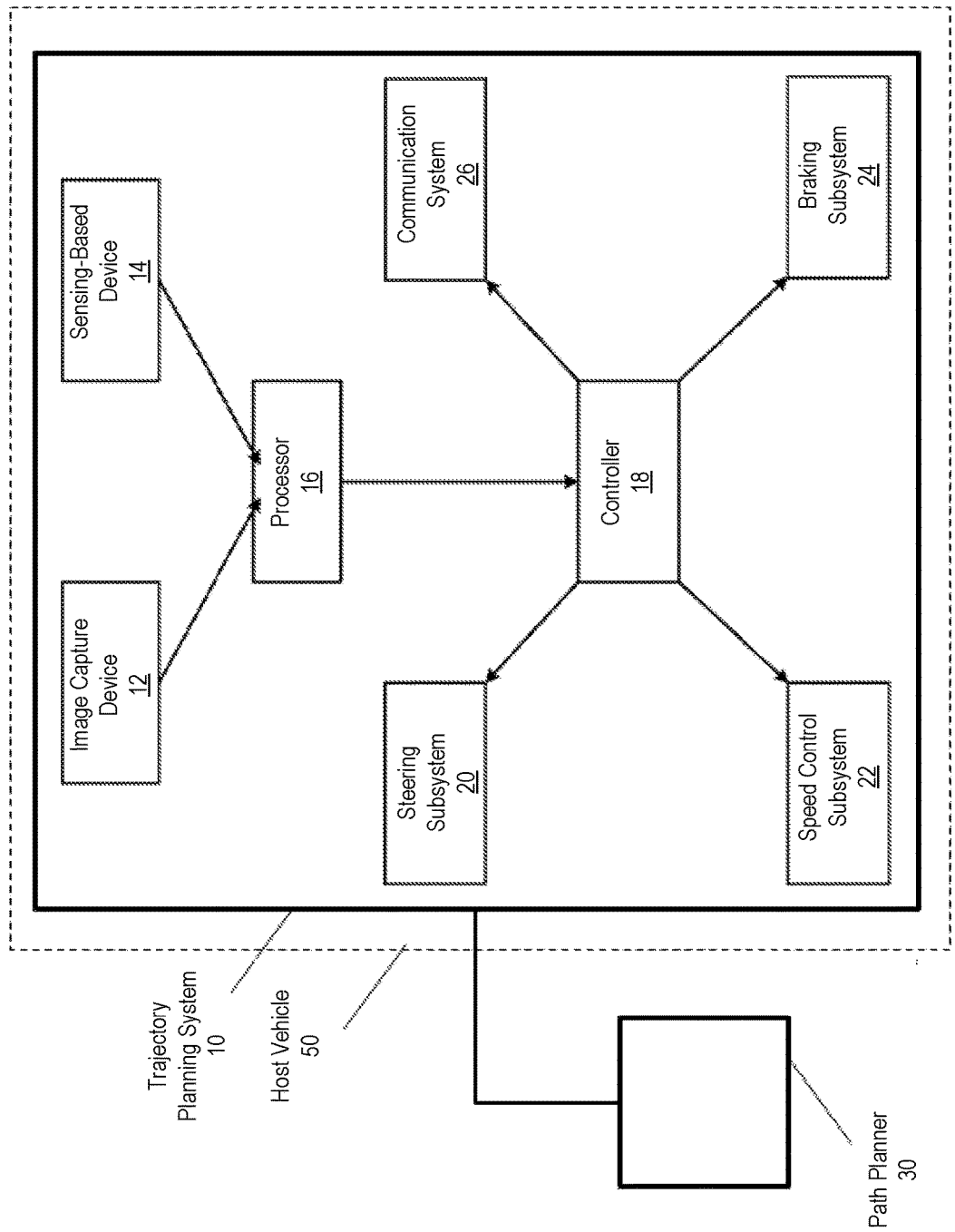
FIG. 1 depicts a block diagram of a trajectory planning system for an autonomous vehicle according to one or more embodiments.

Other features, advantages and details appear, by way of example only, in the following detailed description, the detailed description referring to the drawings in which:

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In autonomous vehicles, typical trajectory planning systems and algorithms use intensive computational effort for attempting to produce globally optimal trajectories. Such global trajectory planning approaches are computationally complicated and, in turn, slow. Such technical challenges are addressed by the technical solutions described herein that provide techniques for the autonomous vehicles to produce safe, comfortable trajectories for on-road driving with reduced computational complexity and execution time. The techniques herein thus improve computational technology by reducing the computational intensity of trajectory planning, and thereby reducing the load on the one or more processors that implement the trajectory planning By leveraging the on-road driving structure, the technical solutions described herein generate safe, comfortable trajectories at a higher rate, and with reduced computational effort compared to typical trajectory planning solutions.

According to one or more embodiments, FIG. 1 depicts a block diagram of a trajectory planning system 10 for a vehicle 50. The vehicle 50 may be an autonomous vehicle or a semi-autonomous vehicle. The vehicle 50 (hereinafter referred to as the host vehicle) includes a vehicle-based image capture device 12 and at least one sensing-based device 14. It should be noted that in one or more examples, the trajectory planning described herein may be performed without image capture devices. FIG. 1 further depicts a path planner 30, which generates a path or route for the host vehicle 50. The path planner 30 determines the route for the host vehicle 50 from a source location to a route destination taking into account factors such as historic road-speed, traffic conditions, weather forecasts etc. The route may be considered as a graph that includes multiple nodes and paths from one node to another node in the graph. The nodes represent a location along the route that is generated. There may be multiple paths between two such nodes and the path planner determines which of these paths to take to move the host vehicle between two such nodes. The path planner 30 provides path planning inputs to the trajectory planning system 10 based on the generated route and the determined path between nodes. In one or more examples, the path planner 30 determines the route for the host vehicle 50 at the beginning of a trip, for example when a user inputs a destination (and a source), the route providing navigation guidance for the host vehicle 50 to reach the destination.

The trajectory planning system 10 determines one or more maneuvers for the host vehicle 50 to perform based on the received inputs from the path planner 30. In one or more examples, the trajectory planning system 10 determines which maneuver to perform and along which trajectory to perform the maneuver. A maneuver herein may be performed by making the host vehicle 50 move along one of various different trajectories. The trajectory planning system 10 can perform local optimization to determine the trajectory. It should be noted that the optimization to determine the trajectory does not typically affect the route that was determined by the path planner 30. Rather, the local optimization is performed within the constraints of following the high-level route from the occupants' initial location to the occupants' destination. It should be noted that local optimization techniques attempt to improve an existing solution within a neighborhood containing similar solutions compared to global optimization techniques that attempt to improve the existing solution by searching the full space of possible solutions. The global optimization techniques may identify an optimal solution for a problem in the entire possible set of solutions for the problem, which may or may not be the existing solution; whereas the local optimization techniques may not identify the optimal solution across the entire set of possible solutions, rather an optimal solution from a subset of the possible solutions.

It should be noted that although the path planner 30 is depicted outside the host vehicle 50 in FIG. 1, in one or more examples, the path planner 30 may be part of the host vehicle 50. Further, in one or more examples, the path planner 30 and the trajectory planning system 10 may be part of the same system.

The image capture device 12 captures images exterior of the host vehicle 50. The images captured by the image capture device 12 are analyzed for detecting lanes of travel of the road represented by lane markings.

The sensing-based device 14 may include, but is not limited to, radar-based devices, lidar-based devices, ultrasonic-based devices, and other devices or a combination thereof, for sensing objects, both stationary and moving, surrounding the host vehicle 50.

A processor 16 processes the image data captured by the image capture device 12 and the sensed data captured by the sensing device 14. The processor 16 analyzes the respective data and identifies objects in the road of travel which the trajectory planning module must avoid for collision free maneuvers.

The processor 16 may be coupled to one or more controllers 18 for initiating or actuating a control action for executing the planned trajectory by maneuvering the host vehicle 50. One or more vehicle subsystems may be actuated and controlled for executing the planned trajectory by performing a corresponding maneuver by the host vehicle. It should be noted that 'executing' or 'performing' a trajectory includes performing the corresponding host vehicle maneuvers, for example by generating one or more control commands executing by the processor 16. The respective vehicle subsystems that may be controlled for performing the planned trajectory include, but are not limited to, a steering subsystem 20, a speed control subsystem 22, and a braking subsystem 24. A communication system 26 may also be utilized for communicating a planned trajectory to detected target vehicles using vehicle-vehicle communications for making the detected target vehicles aware of the planned trajectory.

The steering subsystem 20 may be controlled for actuating a steering maneuver for steering the host vehicle 50 around a detected target vehicle in the host vehicle's lane of travel.

The braking subsystem 24 may enable an electrical, electro-hydraulic or hydraulic braking system where a braking strategy is readied in the event that an autonomous braking force is required by the host vehicle 50 when performing the lane change maneuver.

Speed control subsystem 22 may control the speed of the host vehicle 50 for either accelerating or decelerating the host vehicle 50 during a lane change maneuver.

Figure 2:
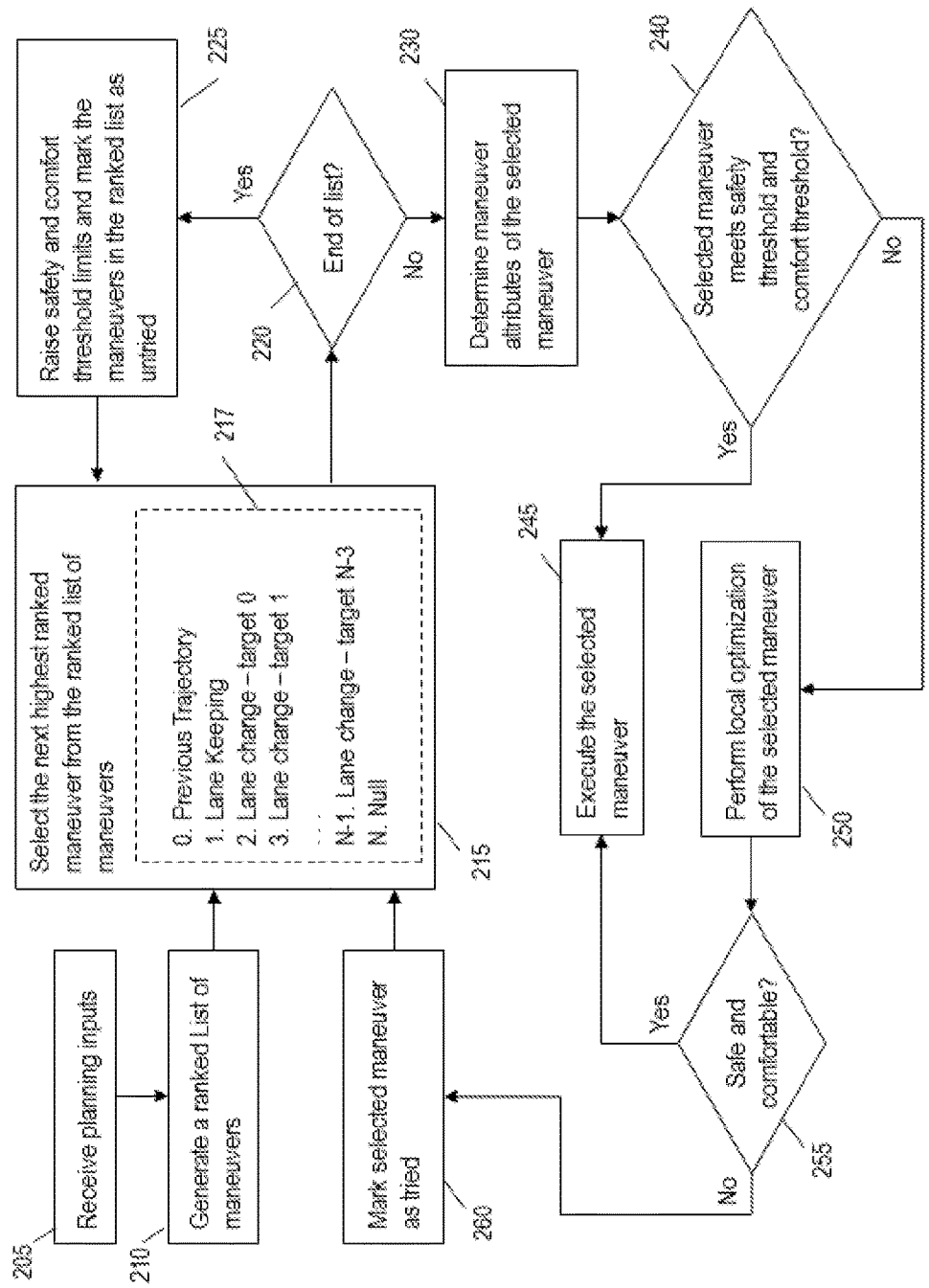
FIG. 2 illustrates a flowchart for a fast trajectory planning for an autonomous vehicle according to one or more embodiments.

FIG. 2 illustrates a flowchart for a fast trajectory planning for a vehicle according to one or more embodiments. The trajectory planning technique is utilized for autonomous or semi-autonomous driving on roads. The trajectory planning method uses lane data detected from the image capture device 12 and sensing device from the sensor-based device 14 and fuses the data into an object map for generating the host vehicle's path waypoints for a short distance ahead. The processor 16 may include a prediction-based processor that can be used to track the generated path for the host vehicle 50. The trajectory planning ensures that the generated path is at a safe distance from detected surrounding objects such as moving objects (e.g. other vehicles, pedestrians, etc.) and stationary objects (e.g., construction barrels, cones, etc.). Further, the trajectory planning ensures that the path is a feasible path that can be tracked while taking into consideration the dynamic constraints of the host vehicle 50. Further, the trajectory planning ensures that the host vehicle 50 remains on the road during the lane change maneuver. Further yet, the trajectory planning takes into account a comfort level of the vehicle occupants when implementing the lane change maneuver.

The trajectory planning regenerates the host vehicle trajectory based on new sensor data even before an end point of a previously determined trajectory is reached. Therefore, the trajectory planning can be referred to as being reactive to any changes in the lane data or object map data.

Referring to the flowchart of FIG. 2, the method includes receiving planning inputs from the path planner 30, at 205. The path planner provides a high-level command to the trajectory planning system 10 such as to make a turn, take an exit (from a highway), take an entry-ramp (to a highway), follow the next vehicle, follow the present lane, or the like. For example, the path planner 30 may receive/generate planning inputs that describe a path such as "take I-85N from Atlanta to Charlotte. Then take I-70 to Pittsburgh." Alternatively, or in addition, in one or more examples, path planning inputs received may include a path generated by the path planner 30 such as "go to location (3, 5) then go to (6, 84) then go to (0, 3)." Here, '(x, y)' depicts coordinates of a location. In this example, the path planner 30 provides a list of coordinates telling the trajectory planner 10 where the host vehicle 50 has to go to stay on the road and make progress toward the destination.

In response, the trajectory planner 10 generates a ranked list 217 of maneuvers, at 210. In one or more examples, the list of maneuvers 217 may be a predetermined list of maneuvers that the trajectory planner 10 can select a maneuver from. For example, the list 217 may include different lane change options, such as changing the lane in which the host vehicle 50 is traveling to a lane-0, or lane-1 etc. The list 217 further includes keeping the current lane. The list 217 may further include an end-of-list (NULL) entry, which is a specific entry at the end of the list 217 to identify the end of the list 217.

For example, consider an example where the received planning inputs includes a list of waypoints from the path planner 30: (0, 0), (10, 0), (20, 0), (20, 10), (20, 20). It should be noted that the above is a simplified example for explanation, and that in other examples the list may include more waypoints and additional attributes. The host vehicle 50 cannot directly follow the coordinates for various reasons. For example, the above list of waypoints does not indicate how fast the host vehicle 50 has to travel between the coordinates in the list. The trajectory planner 10 determines how fast the host vehicle 50 moves. Further, the list of coordinates above specifies making an immediate 90 degree left turn (from (20, 0) to (20, 10)), which may not be safe/comfortable. The trajectory planner 10 determines a smooth trajectory for the operation of the host vehicle 50 for following the path specified by the list of coordinates. Further yet, the host vehicle 50 has to be controlled at much smaller intervals than those used by the path planner 30. For example, the waypoints specified in the list from the path planner 30 may be at 10 meter intervals, the trajectory planner 10 generates a trajectory that indicates operations to be performed at a different order of magnitude, for example, at 10 cm intervals.

Accordingly, the trajectory planner 10 creates a trajectory that facilitates moving the host vehicle 50 from the starting point (0, 0) to the (near-term) destination (20, 20) provided by the path planning inputs. The trajectory also includes a list of coordinates, at a smaller interval than the list of coordinates in the path. The trajectory can be further distinguished from the path, apart from the distinction in the interval. The trajectory includes speed information for the host vehicle 50 to use when traveling between two successive points in the trajectory. Further, the list of coordinates in the trajectory form a smooth curve that the host vehicle 50 can be operated along. As described herein, the trajectory planner 10 receives the path and generates one or more trajectories corresponding to the path, and further determines one or more maneuvers to follow the trajectory. As used herein, a 'maneuver' is an operation that may be performed by the vehicle 50 via multiple different trajectories.

Figure 3:
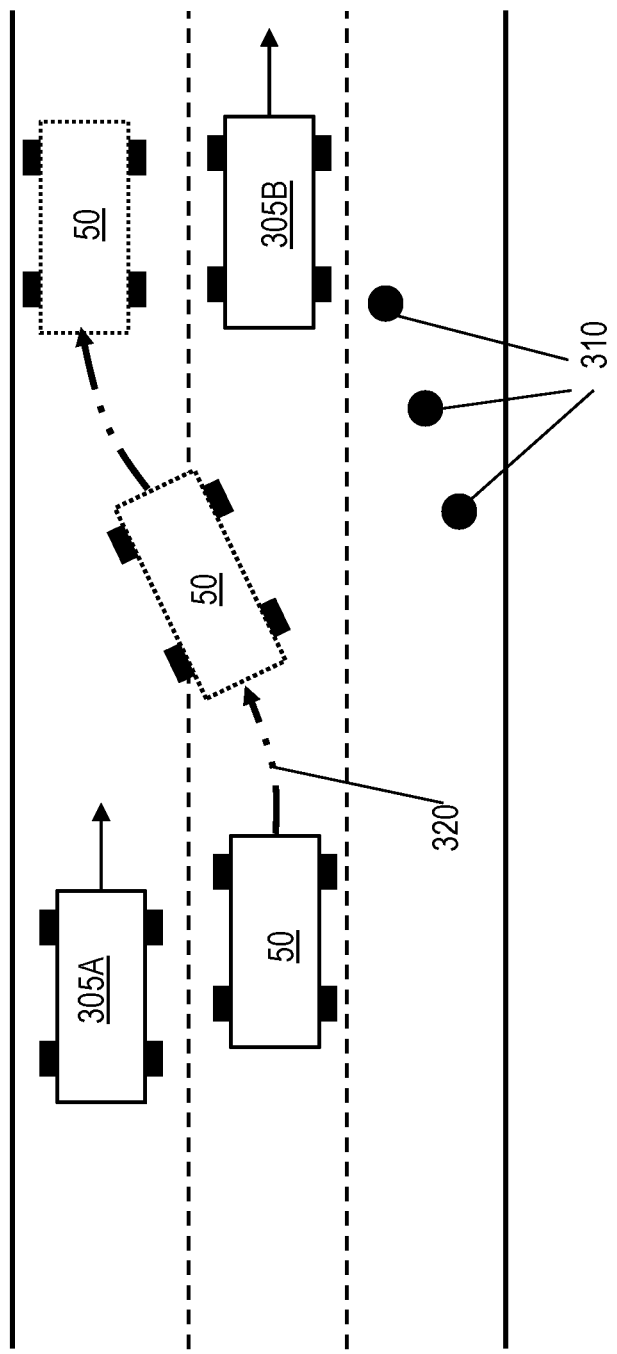
FIG. 3 depicts an example navigation scenario of a host vehicle according to one or more embodiments.

Consider a scenario depicted in FIG. 3 where the host vehicle path has been generated. (FIG. 4 also depicts an example scenario where a variety of candidate trajectories are shown depicting the same command (change lane to left)). Further, consider that in the exemplary scenario depicted, two slow-moving target vehicles 305A and 305B are moving in the same direction as the host vehicle 50, which is driving at 70 km/h. The target vehicle (305A) to the left of the host vehicle 50 is traveling at approximately 30 km/h, and the target vehicle (305B) in a front of the host vehicle 50 is traveling at approximately 30 km/h. Several construction barrels (310) are located in the right lane relative to the host vehicle 50. The trajectory planner 10, based on the scenario, generates a trajectory 320 for the host vehicle 50.

The determined path is received by the trajectory planner 10. The path planner 30 determines the path using one or more route determining algorithms, for example using a graph-based approach that includes using path determining algorithms such as Bellman-Ford, Djikstra, and the like. In one or more examples, the path is split into one or more commands that are provided to the trajectory planner 10 as the path planning inputs. Typical autonomous vehicle trajectory planners perform a costly global optimization to find the absolute least-cost trajectory according to the cost function described in Equation 4. However, the technical solutions described herein shortcuts the optimization procedure as soon as an acceptable trajectory is found. The presented technical solutions cease to search for additional (better) trajectories as soon as a safe and comfortable trajectory has been found. The technical solutions described herein further maneuver the host vehicle 50 according to the determined trajectories.

The trajectory planner 10 ranks the maneuvers in the list 217, with maneuvers for the received command from the path planner 30 ranked higher. For example, if the host vehicle 50 is traveling in a middle lane of a highway, and if the received command from the path planner 30 is to take an exit off the highway, the maneuver to change to the exit lane may be the first ranked maneuver on the list, followed by other maneuvers, such as changing to other lanes. It should be noted that in case of other commands, the ranking can be different. (See description of additional examples herein).

The method further includes selecting the highest ranked untried maneuver from the ranked list of maneuvers 217, at 215. Initially, each entry in the list 217 is marked as 'untried', for example using a flag or any other binary attribute associated with the entries in the list 217. Accordingly, the first time the ranked list 217 is accessed, the very first entry in the list 217 is selected as the highest ranked untried entry. As the method proceeds, the other entries in the list 217 are selected for analysis as described further.

After selection of a maneuver from the list, the method includes checking if the end-of-list (NULL) entry has been selected, at 220. The selection of the end-of-list entry indicates that each maneuver in the list 217 has been analyzed.

If the end-of-list entry has not been selected, the selected maneuver is analyzed. The analysis includes determining maneuver attributes of the selected maneuver, at 230. First, the selected maneuver is used to generate a trajectory connecting a present host vehicle position to a near-term destination, the near-term destination being the next node. If the trajectory is safe and comfortable, the trajectory is executed. If the trajectory is not safe and comfortable, a local trajectory optimization 250 improves the trajectory. If the local optimization yields a second trajectory that is safe and comfortable, the second trajectory is executed. If the second trajectory is also not safe and comfortable, the maneuver pattern is marked as tried, and a next maneuver pattern in the list 215 is evaluated. Once a sufficiently comfortable trajectory has been found, a corresponding set of operations are determined for that trajectory. For example, the set of operations may include, but not limited to a series of acceleration values and steering angles for the host vehicle 50 to perform. The set of operations is sent to the ADAS/the processor 16, for performing the operations for the host vehicle 50.

Figure 4:
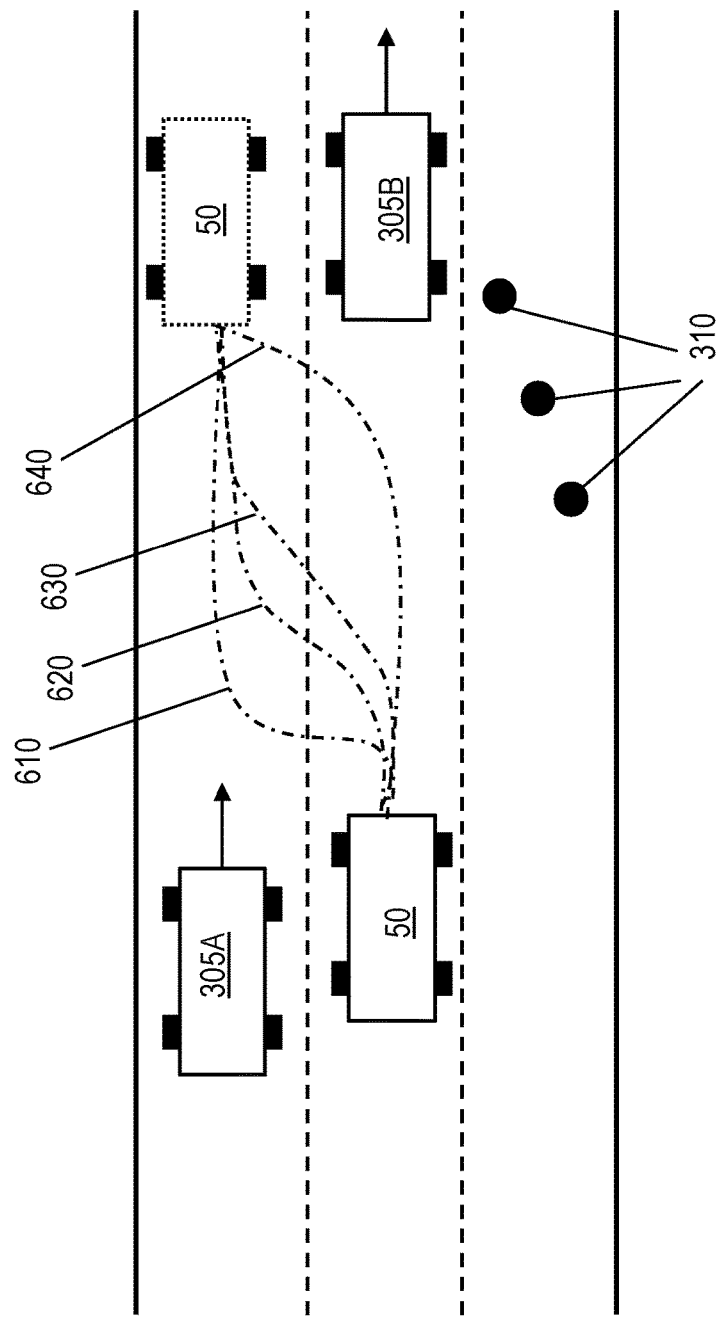
FIG. 4 depicts several trajectories to perform a maneuver according to one or more embodiments.

FIG. 4 depicts several trajectories to perform a maneuver according to one or more embodiments. FIG. 4 depicts the earlier example scenario of the host vehicle 50 performing a maneuver to move into the left lane. As illustrated, the vehicle 50 can perform the maneuver using several different trajectories, a first trajectory 610, a second trajectory 620, a third trajectory 630, and a fourth trajectory 640. It should be noted that although only four trajectories are depicted, there can different number of trajectories to choose from (typically, thousands).

For the host vehicle 50 to move along one of the trajectories for performing the maneuver, the attributes of the host vehicle 50 are to be set accordingly. For example, for the host vehicle 50 to follow the first trajectory 610, the trajectory planning system 10 has to set the acceleration and steering angle of the host vehicle 50 to a first set of initial values. Similarly, a second set of attribute values is used for the second trajectory 620, a third set for the third trajectory 630, and a fourth set of attribute values for the fourth trajectory 640. As can be seen from the illustrated example, the attribute values are different; for example, for the first trajectory 610, the host vehicle 50 may have to be accelerated more and steered more sharply in comparison with the third trajectory 630. Accordingly, selecting a trajectory for performing the maneuver dictates the sequence of attribute values to use and configure for the host vehicle 50.

The method further includes comparing the maneuver attributes, which are the attributes associated with the selected trajectory of the maneuver, with one or more safety limits and comfort limits associated with the host vehicle 50, at 240.

The safety limits include predetermined threshold values that limit the motion command values so that the host vehicle 50 is operated safely. The safety limits are specific to the host vehicle 50. In one or more examples, the safety limits are not configurable by an owner/occupant of the host vehicle 50. For example, the safety limits may specify that the maximum steering adjustment for a maneuver can be 500 degrees, a maximum vehicle speed for a maneuver can be 90 miles per hour, and a maximum acceleration value for a maneuver can be 4.5 meters per second$^2$, or a combination thereof, and the like. The safety limits further include parameters such as a distance between the host vehicle 50 and another vehicle 305 or stationary object 310. It should be noted that the above are examples for the safety limits, and that other safety limits may be used in other examples.

In one or more examples, the method includes computing a safety score for trajectories based on the closest approach to an obstacle, the required lateral and longitudinal acceleration, or other local properties of the trajectory. The objects considered when computing the safety score are local objects from a predetermined vicinity from the host vehicle 50, for example 100 meters, 50 meters, and the like. The path planner 30, does not have information about the local configuration of obstacles. Accordingly, the trajectory planning system 10 improves the safety of the host vehicle 50 by taking the local environment into consideration when producing one or more trajectories in response to input from the path planner 30. Various other factors may be computed and included in the safety score.

Under typical operation, the vehicle is constrained to operate under a set of comfort limits which restrict its maximal acceleration, deceleration, and jerk. It is understood that in other embodiments other parameters can also be used to determine comfort limits than those described herein. The comfort limits are more conservative than the performance limits of the host vehicle 50. For example, if limits are provided for a turning radius, the comfort limit can dictate a larger turning radius as compared to the performance limit (at given same speed). In one or more examples, the comfort limits are configurable, and an owner/occupant of the host vehicle 50 can adjust the comfort limits according to his/her preference. For example, the comfort limits may specify that the maximum steering adjustment for a maneuver can be 400 degrees, a maximum vehicle speed for a maneuver can be 80 miles per hour, and a maximum acceleration value for a maneuver can be 2.5 meters per second per second, or a combination thereof, and the like. It should be noted that the above are examples for the comfort limits, and that other comfort limits may be used in other examples. Typically, the comfort limits are within the safety limits, so that if the comfort limits are met, the safety limits are also met.

In one or more examples, the method includes computing a comfort score for trajectories based on the closest approach to an obstacle, the required lateral and longitudinal acceleration, or other local properties of the trajectory. The objects considered when computing the comfort score are local objects from a predetermined vicinity from the host vehicle 50, for example 50 meters, 30 meters, and the like. The path planner 30, does not have information about the local configuration of obstacles. Accordingly, the trajectory planning system 10 improves the comfort of the occupants of the host vehicle 50 by taking the local environment into consideration when producing one or more trajectories in response to input from the path planner 30. Various other factors may be computed and included in the safety score. If the comfort limits are met by the selected maneuver, the method includes executing the selected maneuver, at 245. Executing the maneuver includes executing the one or more motion commands using the one or more actuators and other vehicle subsystems of the host vehicle 50 to move the host vehicle 50 according to the selected trajectory to perform the maneuver.

If the comfort limits are not met by the selected maneuver, the method includes performing local optimization on the selected maneuver, at 250. The local optimization may be performed using one or more known techniques such as random optimization, Sequential Quadratic Programming (SQP), Covariant Hamiltonian Optimization for Motion Planning (CHOMP) or any other. The local optimization selects a trajectory from the several trajectories (610, 620, 630, and 640) that the host vehicle 50 may use to complete the maneuver.

The attributes of the trajectory selected by the local optimization are compared with the safety and comfort limits, at 255. If the selected trajectory meets the safety and comfort limits, the maneuver is executed via the selected trajectory, at 245.

If the safety and comfort limits are not met by the selected trajectory the entire maneuver is marked as tried and the next maneuver from the ranked list 217 is selected for analysis, at 260 and 215. The selected maneuver is tested according to the operations of the method described earlier.

Referring back to block 220 of the flowchart, if the end of the list is reached (selected maneuver is NULL) the comfort limits of the host vehicle 50 are adjusted, at 225. For example, the comfort limits are increased to equal the host vehicle's maximum performance limits. Further, the maneuvers in the list 217 are marked as 'untried' so that the method can analyze the maneuvers again with the adjusted limit values.

Accordingly, once a maneuver that satisfies the comfort and safety limits is identified, the method executes that maneuver without analyzing the remaining maneuvers that are in the list 217. This facilitates the trajectory planning system 10 to be more responsive and more computationally efficient compared to a system that analyzes each and every maneuver and moreover each and every trajectory from each of the maneuvers to identify a trajectory and maneuver to perform.

Figure 5:
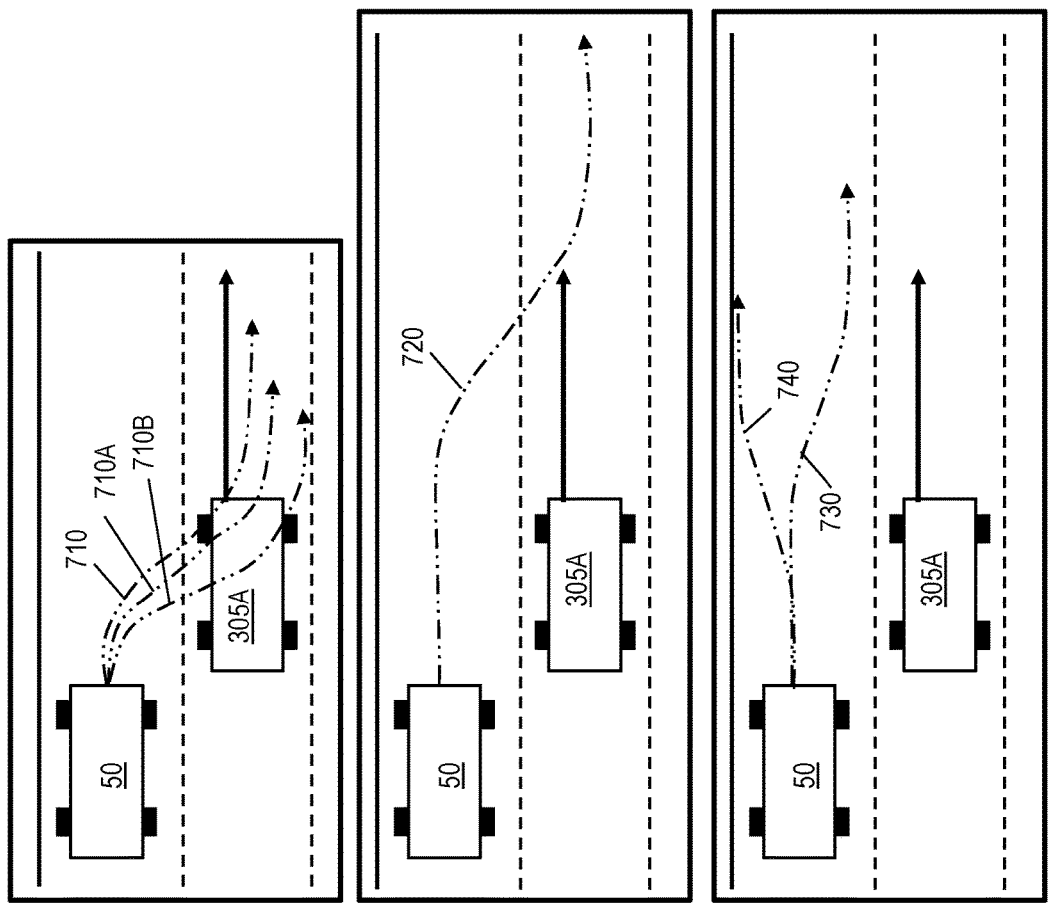
FIG. 5 depicts an example operation of the method in an example scenario according to one or more embodiments.

FIG. 5 depicts an example operation of the method in an example scenario according to one or more embodiments. The example scenario depicted in FIG. 5 involves the host vehicle 50 receiving a command to change lanes to the right. Consider that the highest ranked maneuver includes an immediate right swerve into the right lane and, further, a delayed right swerve as depicted by trajectory 710. However, in the example scenario, the right lane has another vehicle, the target vehicle 305A. Accordingly, upon comparing the safety of the selected trajectory 710, the trajectory planning system 10 determines that the trajectory 710 is both uncomfortable and unsafe (block 240 in FIG. 2). Per the described method, the trajectory planning system 10 performs local optimization and identifies trajectories 710A and 710B, however neither 710A nor 710B are safe due to a collision with target vehicle 305A. Hence, the maneuver is not performed, and a next highest maneuver from the list 217 is selected.

Consider that the next ranked maneuver is depicted by the trajectory 720 that includes accelerating the vehicle 50 for some distance, swerving into the right lane, and then continuing to operate in the right lane subsequently. Consider that the acceleration values associated with the maneuver of the trajectory 720 meet the safety and comfort limits. Accordingly, the maneuver is performed to move the host vehicle 50 along the trajectory 720. As described earlier, further maneuvers such as those depicted by 730 and 740 (and others not shown) are not analyzed by the trajectory planning system in this case as the maneuver 720 is performed.

It should be noted that the above described example is just one example, and that other maneuvers may be performed such as left lane change, lane keep, turn right, turn left, and so on.

The technical solutions described herein reduce the complexity of trajectory planning This facilitates the vehicle to produce trajectory updates much more quickly and to respond more rapidly to changes in its environment compared to typical solutions that analyze the full space of trajectories before executing the maneuver. Further, because implementing the technical solutions does not require expensive computer hardware (e.g. graphics processing unit (GPU), multi-processors, dedicated hardware, and the like), high costs for improving the performance of the trajectory planning are avoided.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, or optical disks. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for maneuvering a vehicle autonomously, the method comprising:
    receiving, by a controller, a command to navigate the vehicle, the command based on a global route calculation;
    ranking, by the controller, maneuver patterns from a list of maneuver patterns to generate a ranked list of maneuver patterns;
    selecting a maneuver pattern from the ranked list, wherein the selected maneuver pattern is the highest untried maneuver pattern from the ranked list;
    in response to a comfort score assigned to the selected maneuver pattern being above a predetermined threshold, executing the maneuver pattern; and
    adjusting the predetermined threshold responsive to none of the maneuver patterns from the ranked list meeting the predetermined threshold.

2. The method of claim 1, wherein a maneuver pattern comprises a plurality of trajectories.

3. The method of claim 2, wherein selecting the maneuver pattern comprises:
    determining the comfort score of a first trajectory from the maneuver pattern based on attribute values assigned to the trajectory and local parameters.

4. The method of claim 3, wherein the local parameters comprise parameters computed for obstacles in a predetermined vicinity surrounding the vehicle.

5. The method of claim 3, the selection of the maneuver further comprises performing a local optimization within the plurality of trajectories to identify a trajectory that satisfies the predetermined threshold for the comfort score.

6. The method of claim 1, wherein the global route calculation is performed based on a source and destination provided to the vehicle for autonomous navigation.

7. A trajectory planning system comprising:
    a memory; and
    a processor coupled with the memory, the processor configured to determine a trajectory for moving a vehicle autonomously, the determination comprising:
        receiving, by a controller, a command to navigate the vehicle, the command based on a global route calculation;
        ranking, by the controller, maneuver patterns from a list of maneuver patterns to generate a ranked list of maneuver patterns, wherein the list comprises and end-of-list NULL entry, which is a specific entry at an end of the list to identify the end of the list;
        selecting a maneuver pattern from the ranked list, wherein the selected maneuver pattern is the highest untried maneuver pattern from the ranked list; and
        in response to a comfort score assigned to the selected maneuver pattern being above a predetermined threshold, executing the maneuver pattern.

8. The system of claim 7, wherein a maneuver pattern comprises a plurality of trajectories.

9. The system of claim 8, wherein selecting the maneuver pattern comprises determining the comfort score of a first trajectory from the maneuver pattern based on attribute values assigned to the trajectory and local parameters.

10. The system of claim 9, wherein the local parameters comprise parameters computed for obstacles in a predetermined vicinity surrounding the vehicle.

11. The system of claim 9, the selection of the maneuver further comprises performing a local optimization within the plurality of trajectories to identify a trajectory that satisfies the predetermined threshold for the comfort score.

12. The system of claim 7, wherein the determining further comprises, adjusting the predetermined threshold if none of the maneuver patterns from the ranked list meet the predetermined threshold.

13. A vehicle controller for determining a trajectory for moving a vehicle autonomously, the determination comprising:
    receiving, by a controller, a command to navigate the vehicle, the command based on a global route calculation;
    ranking, by the controller, maneuver patterns from a list of maneuver patterns to generate a ranked list of maneuver patterns, wherein the list comprises an end-of-list NULL entry, which is a specific entry at an end of the list to identify the end of the list;
    selecting a maneuver pattern from the ranked list;
    in response to a comfort score assigned to the selected maneuver pattern being above a predetermined threshold, executing the maneuver pattern;
    subsequent to executing the maneuver pattern, determining whether the maneuver pattern was successful;
    selecting and exrcuting a next highest maneuver pattern from the ranked list until detecting the end-of-list NULL entry; and
    responsive to detecting the end-of-list NULL entry, lowering the predetermined threshold.

14. The vehicle controller of claim 13, wherein a maneuver pattern comprises a plurality of trajectories.

15. The vehicle controller of claim 14, wherein selecting the maneuver pattern comprises determining the comfort score of a first trajectory from the maneuver pattern based on attribute values assigned to the trajectory and local parameters, wherein the local parameters comprise parameters computed for obstacles in a predetermined vicinity surrounding the vehicle.

16. The vehicle controller of claim 15, the selection of the maneuver further comprises performing a local optimization within the plurality of trajectories to identify a trajectory that satisfies the predetermined threshold for the comfort score.

17. The vehicle controller of claim 13, wherein the selected maneuver pattern is the highest untried maneuver pattern from the ranked list.

18. The vehicle controller of claim 13, wherein the determining further comprises, adjusting the predetermined threshold if none of the maneuver patterns from the ranked list meet the predetermined threshold.

* * * * *